(12) United States Patent
Hipp-Kalthoff et al.

(10) Patent No.: US 10,675,942 B2
(45) Date of Patent: Jun. 9, 2020

(54) CONDENSER UNIT OF A ROOF-MOUNTED AIR CONDITIONING SYSTEM

(71) Applicant: Mahle International GmbH, Stuttgart (DE)

(72) Inventors: Christoph Hipp-Kalthoff, Stuttgart (DE); Hans-Henning Knorr, Remshalden (DE); Klaus Voigt, Bietigheim-Bissingen (DE)

(73) Assignee: Mahle International GmbH (DE)

( * ) Notice: Subject to any disclaimer, the term of this patent is extended or adjusted under 35 U.S.C. 154(b) by 126 days.

(21) Appl. No.: 15/738,576

(22) PCT Filed: Jun. 14, 2016

(86) PCT No.: PCT/EP2016/063558
§ 371 (c)(1),
(2) Date: May 15, 2018

(87) PCT Pub. No.: WO2016/207019
PCT Pub. Date: Dec. 29, 2016

(65) Prior Publication Data
US 2018/0264912 A1    Sep. 20, 2018

(30) Foreign Application Priority Data
Jun. 23, 2015    (DE) .................... 10 2015 211 605

(51) Int. Cl.
*B60H 1/00*    (2006.01)
*B60H 1/32*    (2006.01)

(52) U.S. Cl.
CPC ..... *B60H 1/00521* (2013.01); *B60H 1/00535* (2013.01); *B60H 1/3227* (2013.01); *B60H 2001/00235* (2013.01)

(58) Field of Classification Search
CPC ............ B60H 1/00521; B60H 1/00535; B60H 1/3227; B60H 2001/00235
USPC ........................................................ 62/244
See application file for complete search history.

(56) References Cited

U.S. PATENT DOCUMENTS

| | | | | |
|---|---|---|---|---|
| 4,134,275 A | * | 1/1979 | Erickson | B60H 1/00371 62/243 |
| 4,679,616 A | * | 7/1987 | Ferdows | B60H 1/00371 165/43 |

(Continued)

FOREIGN PATENT DOCUMENTS

| | | |
|---|---|---|
| DE | 4415130 C1 | 4/1995 |
| DE | 102006009735 A1 | 9/2006 |

(Continued)

OTHER PUBLICATIONS

English abstract for DE-102006062261.
(Continued)

*Primary Examiner* — Steve S Tanenbaum
(74) *Attorney, Agent, or Firm* — Fishman Stewart PLLC

(57) ABSTRACT

A condenser unit for a roof-mounted air conditioning system may include a condenser having a plurality of condensation tubes. The longitudinal ends of the plurality of condensation tubes may be connected to a first and second collection tube of the condenser. A carrier may secure the condenser unit to a vehicle roof having a first support region assigned to the first collection tube to support the first collection tube and a second support region assigned to the second collection tube to support the second collection tube. A fan frame may define a flow duct leading from the condenser to a condenser blower. The fan frame may be secured to the carrier having a first retaining region assigned to the first collection tube and a second retaining region assigned to the second collection tube. The condenser may be held on the carrier via the fan frame.

20 Claims, 7 Drawing Sheets

(56) References Cited

U.S. PATENT DOCUMENTS

| | | | | |
|---|---|---|---|---|
| 4,732,011 A | * | 3/1988 | Haiya | B60H 1/00371 |
| | | | | 62/244 |
| 6,698,220 B2 | | 3/2004 | Yoneno et al. | |
| 6,763,669 B1 | * | 7/2004 | Bushnell | B60H 1/00371 |
| | | | | 62/115 |
| 2002/0073723 A1 | * | 6/2002 | Hoos | B60H 1/00371 |
| | | | | 62/244 |
| 2007/0210618 A1 | * | 9/2007 | Hill | B60H 1/00378 |
| | | | | 296/190.09 |
| 2010/0024458 A1 | | 2/2010 | Schmitt et al. | |
| 2010/0218530 A1 | * | 9/2010 | Melbostad | B60H 1/00371 |
| | | | | 62/244 |
| 2013/0185939 A1 | * | 7/2013 | Zapotocky | B60H 1/00371 |
| | | | | 29/890.035 |

FOREIGN PATENT DOCUMENTS

| | | |
|---|---|---|
| DE | 60309229 T2 | 9/2007 |
| DE | 102006047367 A1 | 4/2008 |
| DE | 102006062261 A1 | 6/2008 |
| DE | 102009056968 B3 | 3/2011 |
| DE | 102012018272 A1 | 3/2014 |
| DE | 102012216039 A1 | 5/2014 |
| EP | 1498293 A1 | 1/2005 |
| EP | 2048011 A1 | 4/2009 |

OTHER PUBLICATIONS

English abstract for DE-102006009735.
English abstract for DE-4415130.
English abstract for DE-102009056968.
English abstract for DE-102012018272.
English abstract for DE-102012216039.

* cited by examiner

CONDENSER UNIT OF A ROOF-MOUNTED AIR CONDITIONING SYSTEM

CROSS-REFERENCE TO RELATED APPLICATIONS

This application claims priority to International Application PCT/EP2016/063558 filed on Jun. 14, 2016 and to German Application DE 10 2015 211 605.0 filed on Jun. 23, 2015, the contents of both of which are hereby incorporated by reference in their entirety.

TECHNICAL FIELD

The present invention relates to a condenser unit for a roof-mounted air conditioning system of a road vehicle. The invention additionally relates to a roof-mounted air conditioning system equipped with such a condenser unit.

Air conditioning systems for air conditioning a vehicle interior are generally known. Such an air conditioning system operates with at least one refrigeration circuit, in which a refrigerant is circulated and in which at least one evaporator evaporating the refrigerant, at least one condenser for condensing the refrigerant and at least one delivery device for driving the refrigerant in the refrigerant circuit are arranged. With the help of the evaporator, which is configured as a heat exchanger, an airstream can be cooled which is then to be fed to the vehicle interior to be air conditioned. The heat extracted from the air flow in the process can be conducted via the condenser for example to a surroundings of the vehicle. Practically, the condenser for this purpose is also configured as heat exchanger which, for example, is flowed through by a cooling air flow which takes along the heat.

While in the case of passenger motorcars the air conditioning systems are usually integrated in the vehicle, an external attachment, namely preferably on a vehicle roof is also possible in the case of large capacity vehicles such as for example utility vehicles, buses/coaches and the like. This part of the air conditioning system mounted on the vehicle roof is described as roof-mounted air conditioning system.

Such a roof-mounted air conditioning system comprises at least one evaporator unit, which in a housing comprises an evaporator. Here, the housing usually has a housing lower part and a housing upper part.

In the housing, at least one air filter and at least one evaporator blower can be additionally arranged. The respective evaporator of this evaporator unit is incorporated in a refrigeration circuit as explained above. The associated condenser can basically be arranged in any other suitable location of the vehicle. For example in an engine compartment of the vehicle or in a space of the vehicle in which a radiator of an engine cooling circuit is also arranged. In particular, the roof-mounted air conditioning system can thus be connected via the refrigeration circuit to a condenser that is already present on the vehicle anyway. Provided that the roof-mounted air conditioning system is equipped with its own condenser, it additionally comprises a condenser unit which comprises at least one condenser. Furthermore, a condenser blower can be provided. A fan frame can also be practically provided which defines a flow duct connecting the condenser to the condenser blower.

Furthermore, such a roof-mounted air conditioning system can be equipped with a hood which serves for covering the evaporator unit and if applicable for covering the condenser unit.

Such roof-mounted air conditioning systems have a comparatively complex structure so that the expenditure for producing and mounting such a roof-mounted air conditioning system on the vehicle is comparatively great.

BACKGROUND

A roof-mounted air conditioning system for a rail vehicle is known for example from DE 10 2009 056 968 B3. It has box-shaped housing in which a plurality of evaporator units and a plurality of condenser units are accommodated, wherein a frame of the housing has inlet openings for the evaporators and inlet openings for the condensers. A cover fitted onto the frame closes the housing.

Further roof-mounted air conditioning systems for road vehicles are also known from DE 10 2006 047 367 B4, DE 10 2012 018 272 A1 and from DE 10 2012 216 039 A1. Each of these are characterized in that two evaporator units are arranged on both sides of a condenser unit arranged in the middle, so that the condenser unit with respect to a vehicle transverse direction is arranged the two evaporator units. In the case of DE 10 2012 216 039 A1, the two evaporator units have a housing lower part each which in each case are attached to a housing lower part of the condenser unit arranged in between. In the case of DE 10 2006 047 367 B4, the housings for the evaporator units and for the condenser unit are constructed modularly in the vehicle longitudinal direction so that between two end modules a varying number of intermediate modules can be arranged. To this end, the basic bodies of the housings and the associated flaps for closing the basic bodies that are open towards the top are fixable to one another in the vehicle longitudinal direction. From DE 10 2012 018 272 A1 it is known to cover the basic bodies of the housings for the evaporator units and the condenser unit with the help of hoods, wherein the hoods of the lateral evaporator units located outside are pivotably mounted on the middle hood of the middle condenser unit about a pivot axis running parallel to the vehicle longitudinal axis.

A condenser unit that is employed here comprises at least one condenser, which with usual design comprises a plurality of condensation tubes running parallel to one another in a longitudinal direction of the condenser, which at their longitudinal ends are connected on the one hand to a first collection tube of the condenser and on the other hand to a second collection tube of the condenser. The two collection tubes extend parallel to one another and in each case in a transverse direction of the condenser. For mounting the condenser in a housing of the condenser unit, suitable retaining elements can be provided on the condenser, for example retaining straps, which are soldered onto the collection tubes at the longitudinal ends of the condenser. On the housing side, fastening points which are complementary thereto will then have to be provided. The expenditure for producing and assembling such a condenser unit is thus comparatively great.

The present invention deals with the problem of stating an improved embodiment for such a condenser unit or for a roof-mounted air conditioning system equipped with such, which is characterized in particular by a cost-effective production or by a simplified assembly.

According to the invention, this problem is solved through the subject of the independent claim. Advantageous embodiments are subject of the dependent claims.

SUMMARY

The invention is based on the general idea of fixing the condenser to a carrier of the condenser unit with the help of the fan frame in such a manner that additional fastening means can be omitted. For this purpose, two support regions are provided on the carrier which are assigned to the two collection tubes of the condenser. In addition, two retaining regions are provided on the fan frame which are likewise assigned to the two collection tubes of the condenser. The retaining regions, the support regions and the collection tubes are matched to one another so that a or first collection tube is held on the one or first contact region of the one or first retaining region while the other or second collection tube is held on the other or second support region with the help of the other or second retaining region. In other words, the first retaining region with the first support region forms a first mounting for the first collection tube, while the second retaining region with the second support region forms a second mounting for the second collection tube. The condenser is now positioned and fixed within the condenser unit via this first mounting and this second mounting. Accordingly, additional, separate fastening means are not required for fixing the condenser within the condenser unit. A preferred embodiment is therefore obtained when the condenser is positioned and fixed within the condenser unit exclusively via this first mounting and this second mounting.

According to an advantageous embodiment, the first mounting can be configured as fixed bearing while the second mounting can be configured as loose bearing. The loose bearing makes possible relative movements of the second collection tube within the second mounting along the longitudinal direction of the condenser. In this way, the condenser can expand in a thermally induced manner relative to the carrier and relative to the fan frame without stresses occurring in the process. In detail, the first support region, the first retaining region and the first collection tube form the fixed bearing for the condenser with respect to the longitudinal direction of the condenser, while the second support region, the second retaining region and the second collection tube form the loose bearing for the condenser with respect to the longitudinal direction of the condenser. Thermally-induced relative movements can occur in particular during the operation of the condenser unit since the metallic condenser generally has a different thermal expansion coefficient than the carrier preferentially produced from plastic or the fan frame preferentially produced from plastic.

In another advantageous embodiment, at least one contact contour can be provided in the first mounting, that is on the first support region and/or on the first retaining region, which at least partly engages over the first collection tube on a side facing the second collection tube. Because of this, a relative movement of the condenser in the region of the first collection tube in the longitudinal direction is delimited by the said contact contour.

Preferentially, the first collection tube lies against this contact contour in the longitudinal direction. The contact contour forms a form-fit positioning for the first collection tube with respect to the longitudinal direction in such a manner that the first collection tube, at best, can move as far as to the contact with this contact contour in the direction of the second collection tube.

In another embodiment, a contact rib can be provided in the first mounting, i.e. on the first support region and/or on the first retaining region, which on the first collection tube on a side facing the second collection tube engages in an intermediate space which is formed between two adjacent condensation tubes. Because of this, a particularly intensive form-fit with respect to the longitudinal direction is realised between the first mounting and the first collection tube. At the same time, a positioning of the condenser with respect to the transverse direction of the condenser can also be realised because of this, which simplifies the assembly of the condenser.

The condensation tubes are arranged in the transverse direction of the condenser next to one another or adjacent to one another. In the intermediate spaces of adjacent condensation tubes, fins can be arranged in the usual manner in order to improve the heat transfer between an air flow, flowing through the condenser from the outside and a refrigerant, flowing in the interior of the condenser. The condensation tubes can be practically designed as flat tubes which are characterized by a flat cross section, the width of which is significantly larger than its height. The height of this cross section extends in the transverse direction of the condenser while the width of the cross section extends perpendicularly to a condenser plane, which is defined by the transverse direction and the longitudinal direction of the condenser.

In another advantageous embodiment, the first retaining region and the second retaining region can be integrally moulded on the fan frame. Preferably, the fan frame can be injection moulded from a plastic. For this reason, the first retaining region and the second retaining region can be particularly cost-effectively produced jointly with the remaining fan frame in one piece from plastic using an injection moulding technology.

In another embodiment, the carrier can comprise a frame for fastening the condenser unit to the vehicle roof, on which the first support region and the second support region are formed. Thus, the support regions couple the condenser to the frame, which is prepared and formed for the assembly on the vehicle roof.

According to a further development, the first support region and the second support region can be integrally moulded on the frame. The frame can be particularly cost-effectively produced from plastic using an injection moulding technology. Thus, the support regions can be integrated in the production of the frame so that the two support regions can be produced jointly with the remaining in one piece by way of injection moulding.

In another advantageous embodiment, the frame can be configured substantially flat and lie in a frame plane. Furthermore, the condenser can be substantially configured flat and lie in a condenser plane. In the assembled state, the frame plane and the condenser plane are inclined towards one another within the condenser unit. It has been shown that a particularly flat design for the roof-mounted air conditioning system equipped with the condenser unit can thereby be realised.

According to an advantageous further development, the condenser can lie, in the region of a first transverse end, nearer to the frame plane than in the region of a second transverse end of the condenser. Because of this, an air inlet opening can be formed in the region of the second transverse end between the frame and the condenser. Through the inclination between frame plane and condenser plane, this air inlet opening can be realised particularly easily wherein at the same time a relatively low height for the condenser unit and ultimately for the roof-mounted air conditioning system equipped with the same can be realised. For example, a comparatively small angle can be included between the frame plane and the condenser plane which amounts to maximally 30°, preferentially maximally 20° and in particular maximally 15°.

In another advantageous embodiment, the fan frame can comprise an air outlet opening on or in which the condenser blower is arranged. Optionally, the condenser blower can be fastened to the fan frame. The condenser blower in this case operates as suction blower, which generates an air flow in the flow duct that is sucked in by the condenser and blown out through the air outlet opening. Practically the condenser blower is arranged within the fan frame on the air outlet opening as a result of which the condenser unit is a particularly compact construction.

In another advantageous further development it can be provided that the air outlet opening lies in an outlet plane which extends substantially parallel to the frame plane. It is practically provided, furthermore, that the second transverse end of the condenser lies in the region of this outlet plane. This design also results in an extremely compact construction of the condenser unit.

The transverse ends of the condenser relate to the transverse direction of the condenser while the longitudinal ends of the condenser relate to the longitudinal direction of the condenser.

A roof-mounted air conditioning system according to the invention, which is suitable for a road vehicle, is equipped with an evaporator unit having at least one evaporator. The roof-mounted air conditioning system, furthermore, is equipped with a condenser unit of the type described above. Finally, the roof-mounted air conditioning system is equipped with a hood which is dimensioned so that it covers the evaporator unit and the condenser unit.

Usually, the evaporator unit can additionally comprise an evaporator blower in order to drive a cooling air flow. Practically, the evaporator and the condenser are incorporated in a refrigeration circuit in which a refrigerant circulates, in order to realise a refrigeration process. In the refrigeration circuit, a compressor or the like for driving the refrigerant is usually arranged.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically.

DETAILED DESCRIPTION

Figure 1:
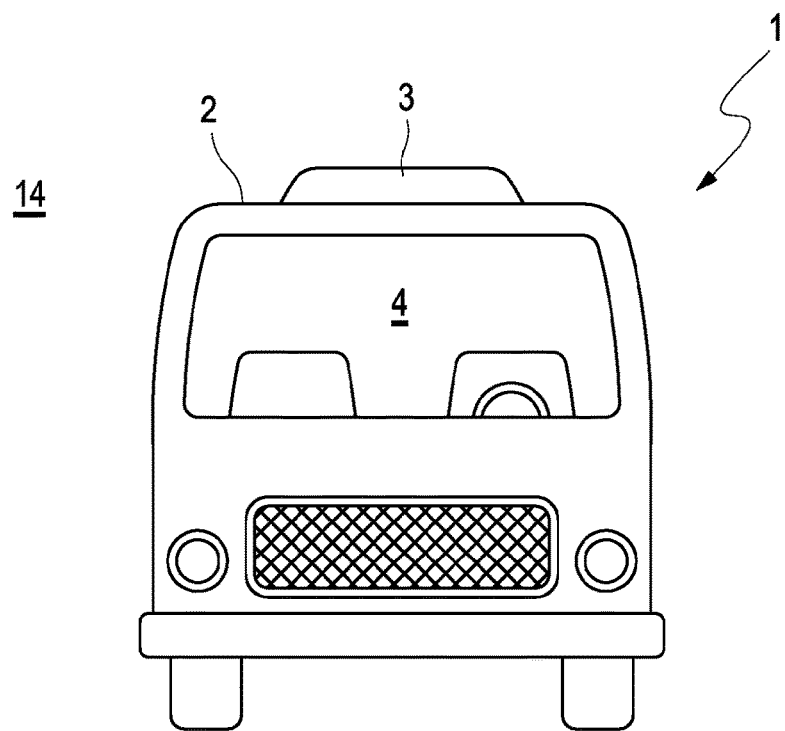
FIG. 1 a greatly simplified front view of a road vehicle with roof-mounted air conditioning system, FIG. 2 an isometric view from above of the roof-mounted air conditioning system, FIG. 3 an expanded isometric view from above of the roof-mounted air conditioning system, FIG. 4 an isometric view from above of the roof-mounted air conditioning system with omitted hood in the region of a condenser unit, FIG. 5 an isometric view from above as in FIG. 4, however with omitted fan frame, FIG. 6 an isometric view from above as in FIG. 5, however with omitted condenser, FIG. 7 an isometric view of a fixed bearing region of the condenser with omitted fan frame, FIG. 8 an isometric view as in FIG. 7, however with the fan frame, FIG. 9 an isometric view of a loose bearing region of the condenser with omitted fan frame, FIG. 10 an isometric view as in FIG. 9, however with the fan frame, FIG. 11 an isometric view of the condenser unit in the region of the loose bearing.

According to FIG. 1, a road vehicle 1, which is represented as a bus/coach here, can comprise a roof-mounted air conditioning system 3 on its vehicle roof 2, which serves for cooling a vehicle interior 4.

Figure 2:
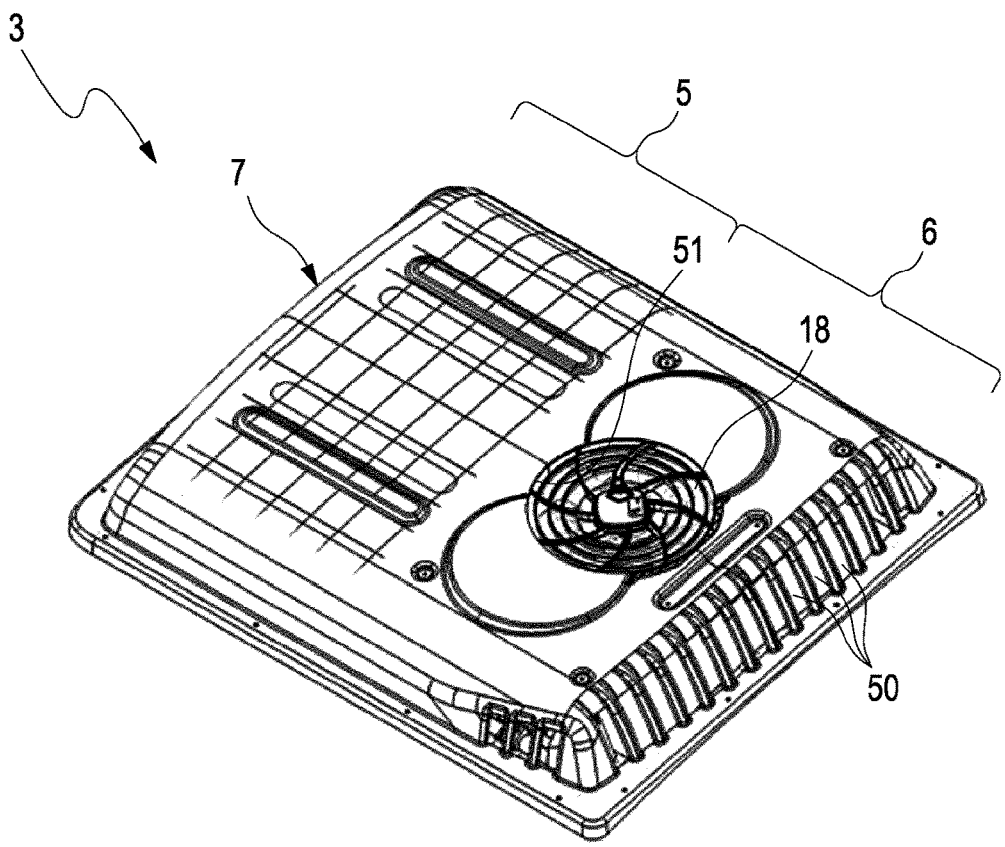
Figure 3:
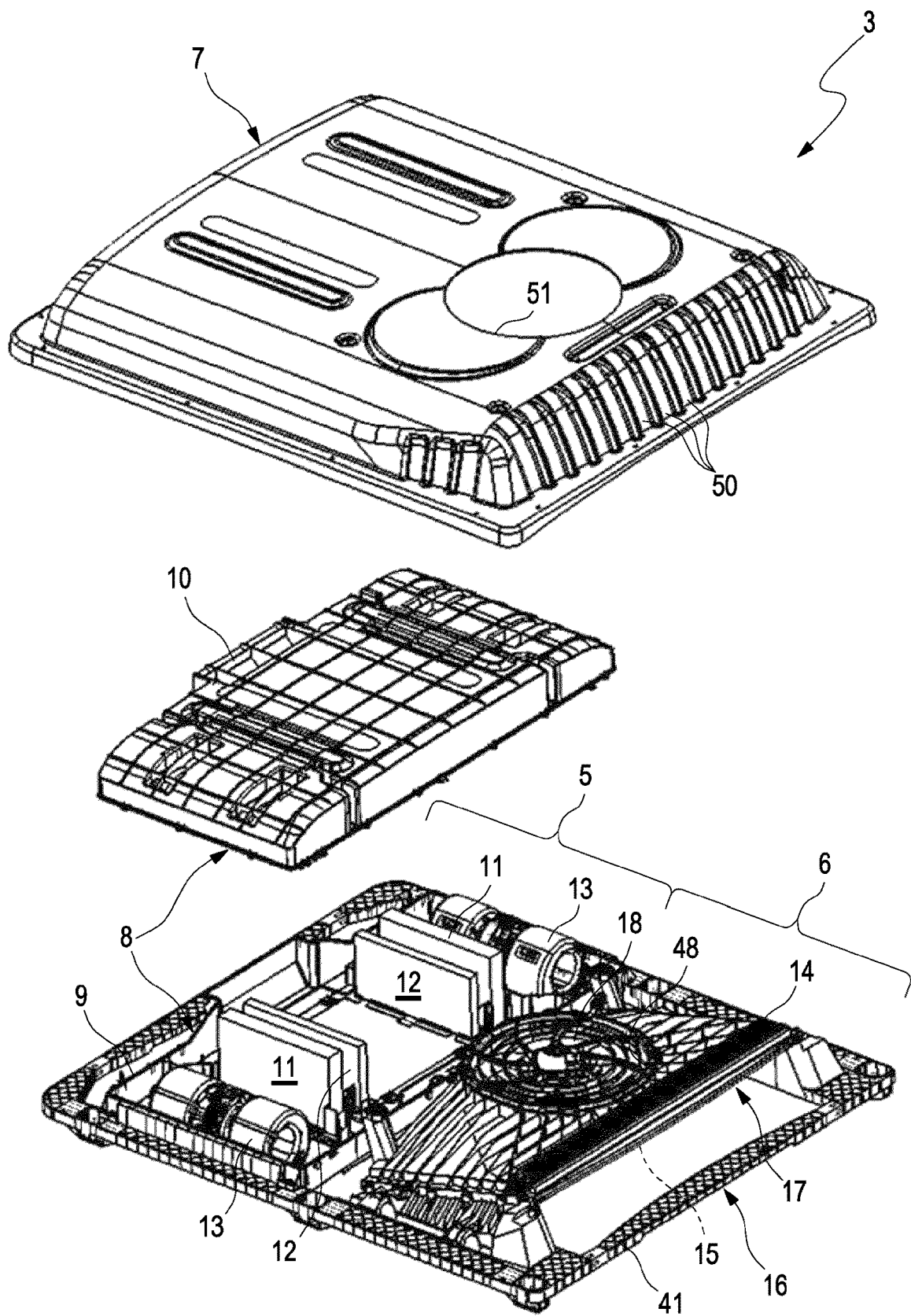

According to FIGS. 2 and 3, such a roof-mounted air conditioning system 3 comprises an evaporator unit 5 and a condenser unit 6, which are covered by a common hood 7. The evaporator unit 5 according to FIG. 3 comprises a housing 8 which has a housing lower part 9 and a housing upper part 10. In the housing 8, at least one evaporator 11 is arranged. In the shown examples, two such evaporators 11 are provided. An air filter 12 is arranged upstream and an evaporator blower 13 of each evaporator 11. The evaporator unit 5 serves for cooling an air flow which can be fed to the vehicle interior 4. To this end, the evaporator unit 5 can suck in air from a surroundings 14 of the vehicle 1 in order to feed cooled fresh air to the vehicle interior 4. Likewise, the evaporator unit 5 can extract air from the vehicle interior 4 feeding it back again to the vehicle interior 4 in the form of cooled circulating air. Usually there is a mixed operation in which the evaporator unit 5 admixes fresh air to the circulating air in it to the vehicle interior 4 in the cooled state. The mixing ratio is adjustable within preset limits. For example, the fresh air quantity sucked in from the surroundings 14 can be controlled for this purpose. To this end, the evaporator unit 5 can be equipped with a control device which is not shown, which works for example with control flaps, control slides or the like.

The respective evaporator 11 is incorporated in a refrigeration circuit which is not shown, in which a refrigeration cycle with phase change of a refrigeration medium takes place in the respective evaporator 11.

According to FIGS. 3 to 11, the condenser unit 6 comprises a condenser 15, a carrier 16, a fan frame 17 and a condenser blower 18. The condenser 15 according to FIGS. 5 and 7 to 10 comprises a plurality of condensation tubes 19, which in a longitudinal direction 20 of the condenser 15 run parallel to one another and which with respect to a transverse direction 21 of the condenser 15 are arranged next to one another and are adjacent to one another. Furthermore, the condenser 15, at its longitudinal ends or at the longitudinal ends of the condensation tubes 19, comprises on the one hand or one end a first collection tube 22 and on the other hand or other end a second collection tube 23. The two collections tubes 22, 23 are connected, for example soldered to the condensation tubes 19. The collection tubes 22, 23 extend parallel to one another and parallel to the transverse direction 21 of the condenser 15. The collection tubes 22, 23 in the condenser 15 serve for feeding the largely gaseous refrigerant or discharging the largely liquid refrigerant. In the condensation tubes 19, the condensation of the refrigerant, i.e. the phase change from gaseous to liquid takes place, which is accompanied by a major heat output.

The carrier 16 serves for fastening the condenser unit 6 to the vehicle roof 2 and comprises two support regions, namely a first support region 24 and a second support region 25, which in the longitudinal direction 20 of the condenser 15 are spaced from one another and extend in each case in the transverse direction 21 of the condenser 15. The first support region 24 is assigned to the first collection tube 22 and formed so that the first collection tube 22 comes to lie against the same. The second support region 25 is assigned to the second collection tube 23 and configured so that the second collection tube 23 comes to lie against the same.

The fan frame 17 comprises two retaining regions, namely a first retaining region 26 and a second retaining region 27, which in the longitudinal direction 20 of the condenser 15, are spaced from one another and which extend parallel to the transverse direction 21 of the condenser 15. The first retaining region 26 is assigned to the first collection tube 22. The second retaining region 27 is assigned to the second collection tube 23. The retaining regions 26, 27 and the support regions 24, 25 are matched to the collection tubes 22, 23 so that in the assembled state, the condenser 15 is held on the carrier 16 with the help of the fan frame 17. To this end, the first collection tube 22 with the first retaining region 26 is held on the first support region 24, while the second collection tube 23 with the second retaining region 27 is held on the second support region 25. In the assembled state, the first retaining region 26 and the first support region 24 thus form a first mounting 28 for the first collection tube 22, while the second retaining region 27 with the second support region 25 form a second mounting 29 for the second collection tube 23.

Figure 7:
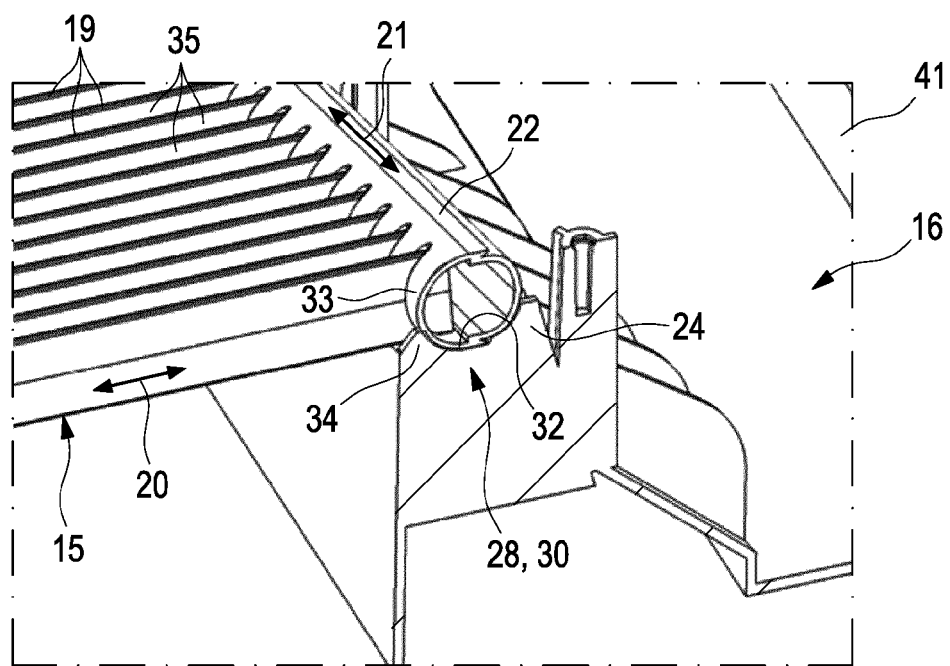
Figure 8:
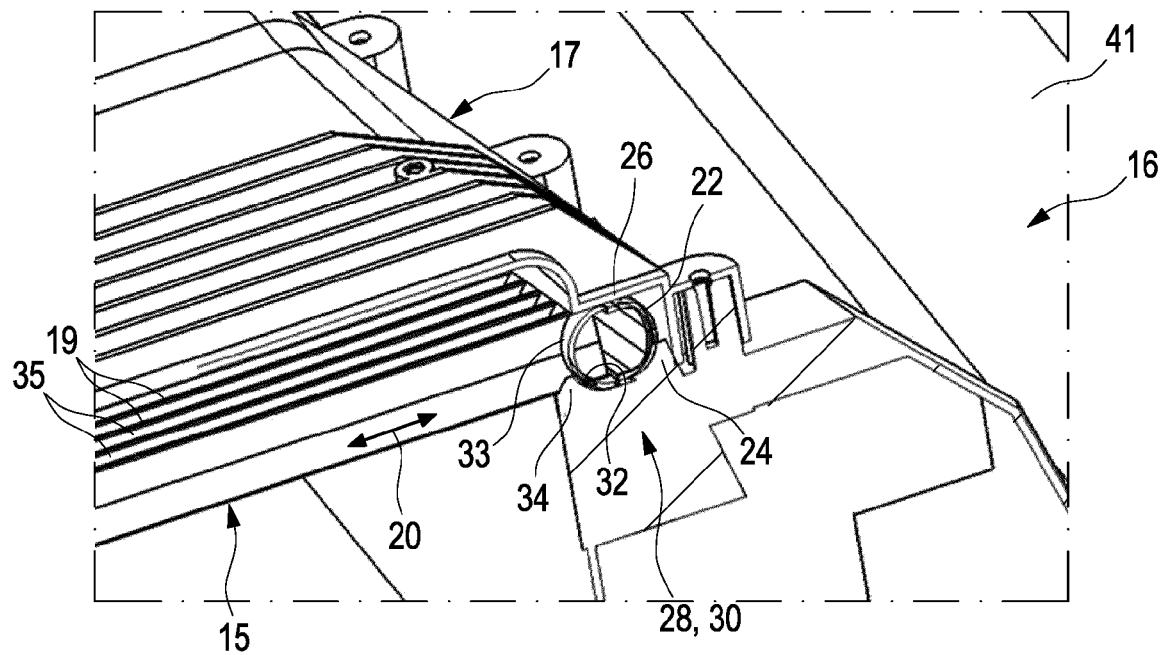

In FIGS. 7 and 8, an isometric sectional view is reflected in each case in the region of the first mounting 28, namely in FIG. 7 without the fan frame 17 and in FIG. 8 with the fan frame 17. Analogous to this, the FIGS. 9 and 10 each show an isometric sectional view in the region of the second mounting 29, namely in FIG. 9 without the fan frame 17 and in FIG. 10 with the fan frame 17. According to FIGS. 7 to 10, the first mounting 28 forms a fixed bearing 30 for the first collection tube 22 and thus for the condenser 15. The second mounting 29 by contrast forms a loose bearing 31 for the second collection tube 23 and thus for the condenser 15. In detail, the first support region 24, the first retaining region 26 and the first collection tube 22 form the fixed bearing 30 for the condenser 15 while the second support region 25, the second retaining region 27 and the second collection tube 23 form the loose bearing 31 for the condenser 15.

For realising the fixed bearing 30, a contact contour 32 can be provided on the first support region 24 according to FIGS. 7 and 8 which is formed so that it on a side 33 facing the second collection tube 23 partly engages over the first collection tube 22. In the example of FIGS. 7 and 8, the contact contour 32 comprises at least one contact rib 34 which is formed so that it engages in an intermediate space 35 on the side 33 of the first collection tube 22 facing the second collection tube 23, which intermediate space 35 is formed between two condensation tubes 19, which in the transverse direction 21 of the condenser 15 are adjacent to one another. Practically, a plurality of such contact ribs 34 are formed in the region of the fixed bearing 30. The first collection tube 22 lies against the contact contour 32 or against the contact ribs 34 in the longitudinal direction 20 of the condenser 15. Because of this, the first collection tube 22 is fixed on the carrier 16 in the longitudinal direction 20 of the condenser 15. By way of the contact ribs 34, which engage in intermediate spaces 35, a form-fit fixing of the condenser 15 in the region of the first collection tube 22 on the carrier 16 in the transverse direction 21 of the condenser 15 takes place at the same time.

Figure 9:
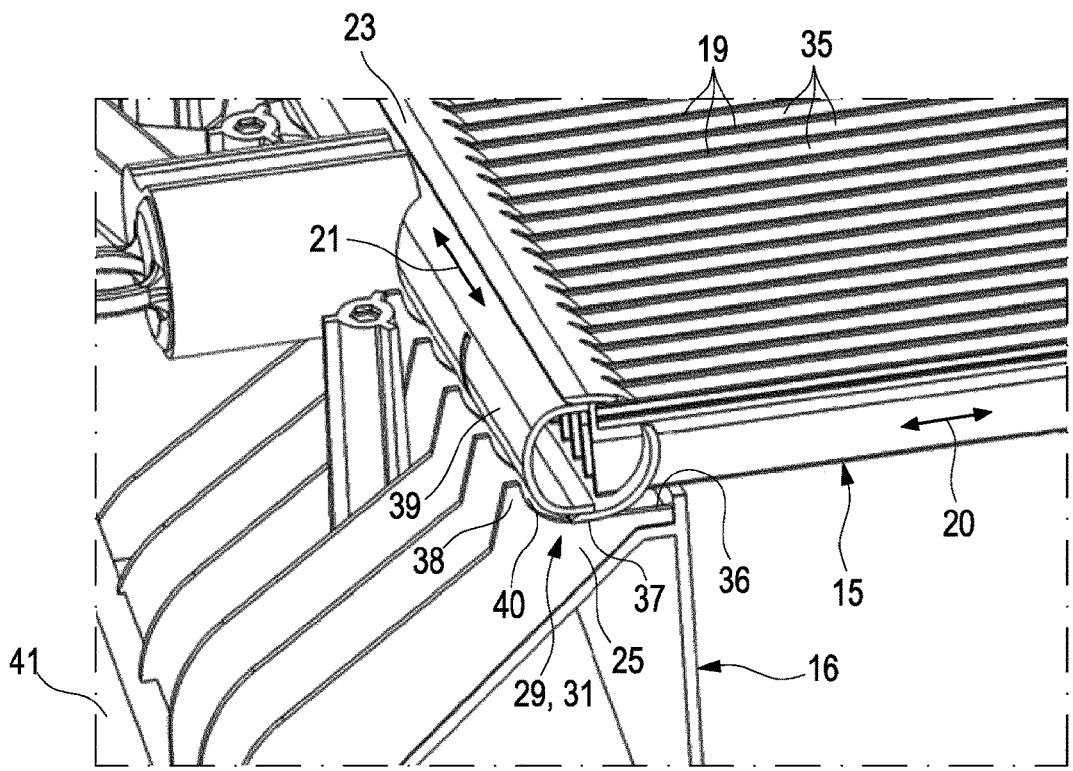
Figure 10:
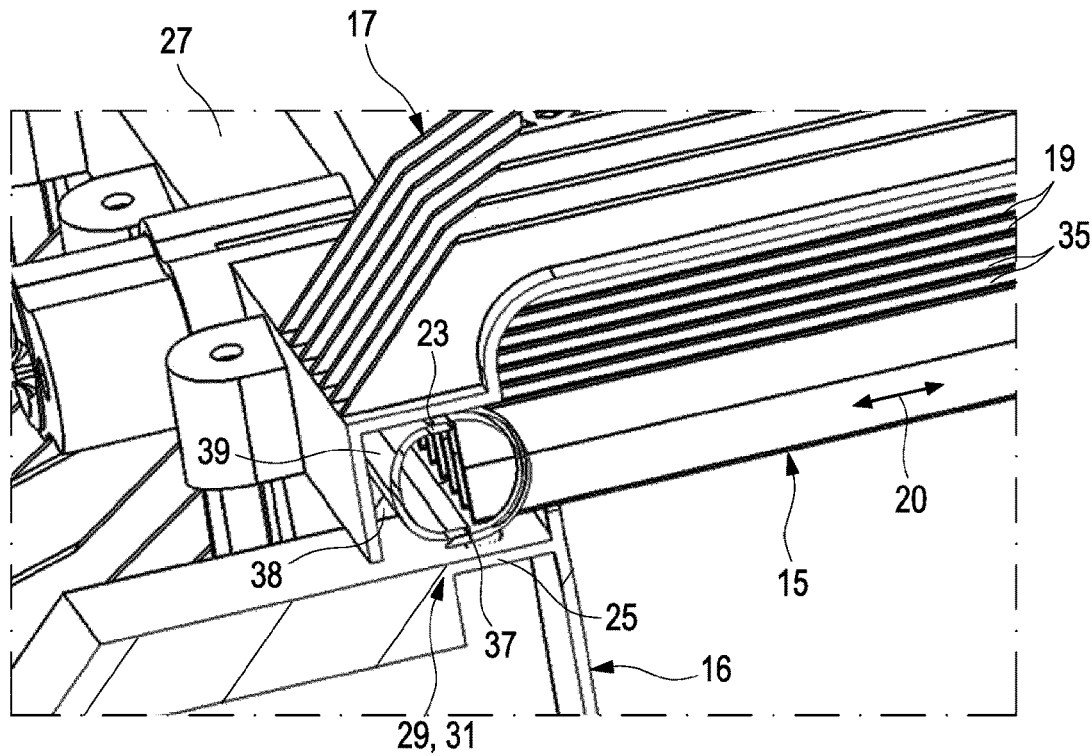
Figure 11:
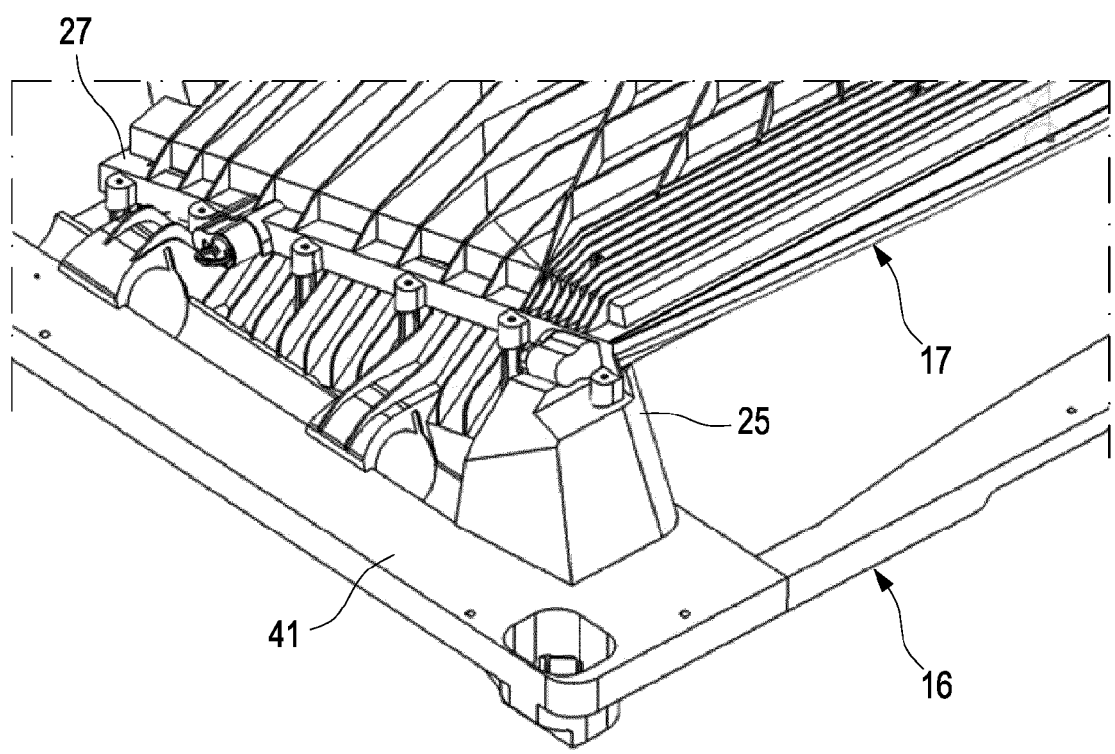

For realising the loose bearing 31, a sliding contour 36 can be formed in the second mounting 29 according to FIGS. 9 and 10, which permits a relative movement of the second collection tube 23 in the longitudinal direction 20 of the condenser 15. To this end, this sliding contour 36 is designed flat and orientated parallel to the longitudinal direction 20 of the condenser 15 in the region of a contact point 37, in which the second collection tube 23 is in contact with the sliding contour 36. The sliding contour 36 can define an end stop 38 which engages over the second collection tube 23 on a side 39 facing away from the first collection tube 22. This end stop 38 is likewise configured rib-shaped here so that it can also be described as end stop rib 38. Between the second collection tube 23 and this end stop 38 however a distance 40 or play 40 is usually provided in order to make possible the longitudinal movability of the condenser 15 in the region of the second collection tube 23 relative to the carrier 16. The end stop 38 can facilitate assembling the condenser 15 on the carrier 16.

Preferentially, the carrier 16 is an injection moulded part produced from plastic. The fan frame 17 is practically also an injection moulded part produced from plastic. It is particularly advantageous now to mould the two retaining regions 26, 27 integrally on the injection moulded fan frame 17.

Although in the example shown here the contact contour 32 or the contact ribs 34 in the region of the fixed bearing 30 are exclusively moulded on the first support region 24, an embodiment is also conceivable in principle in which the contact contour 32 or the contact ribs 34 are exclusively moulded on the first retaining region 26 or both on the first support region 24 and also on the first retaining region 26. Similar applies also to the sliding contour 36 and the end stop 38 which in the example of FIGS. 9 and 10 are exclusively formed in the second support region 25. Accordingly, the sliding contour 36 or the end stop rib 38 can also be formed exclusively in the second retaining region 27. It is likewise possible to from the sliding contour 36 and the end stop rib 38 both on the second support region 25 and also on the second retaining region 27.

In the embodiments shown here, the carrier 16 comprises a frame 41 which is provided for fastening the condenser unit 6 to the vehicle roof 2. On this frame 41, the first support region 24 and the second support region 25 are formed. Preferably, the frame 41 is injection moulded from plastic. Practically, the two support regions 24, 25 can be integrally moulded on the frame 41.

Figure 4:
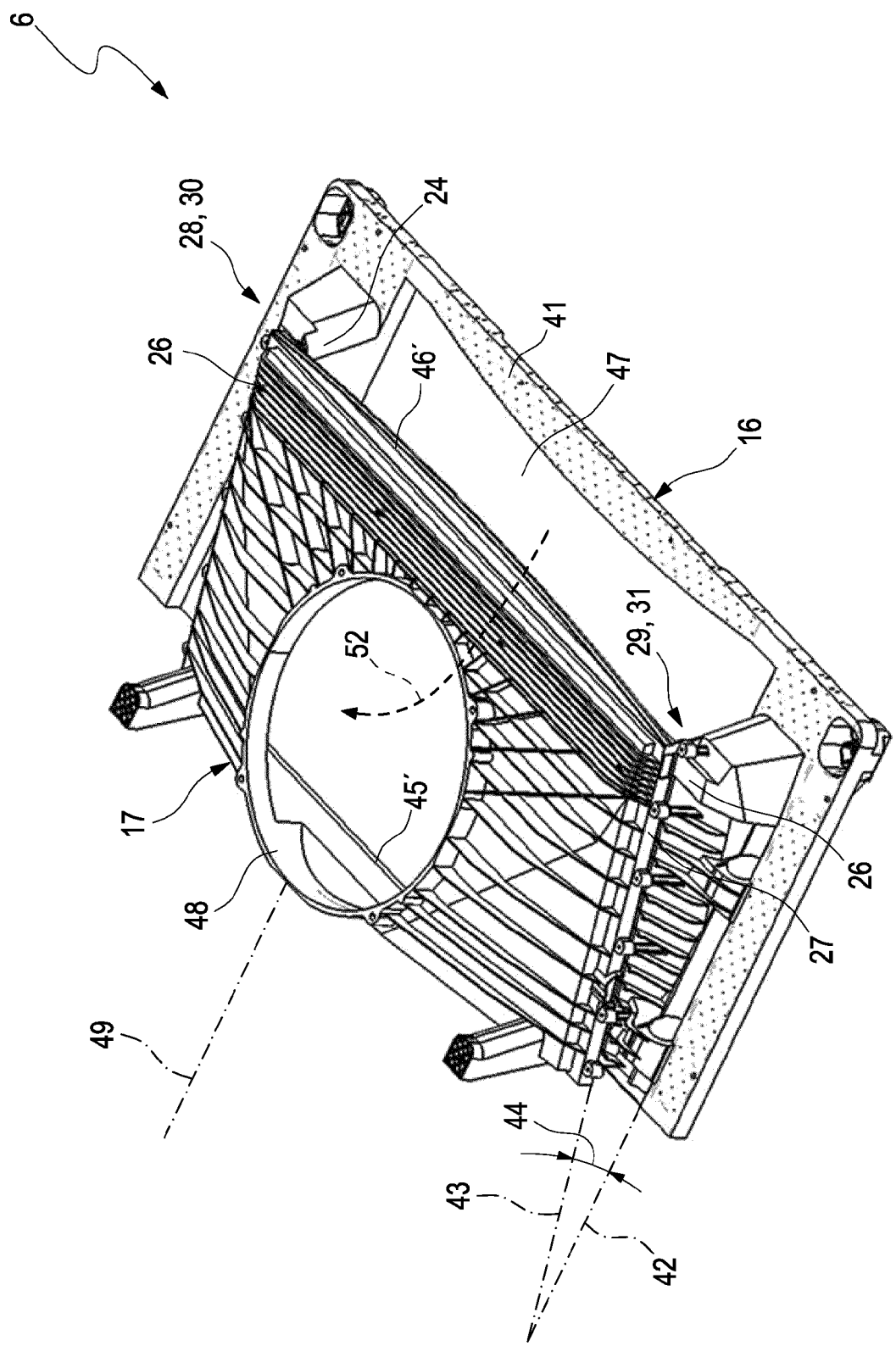
Figure 5:
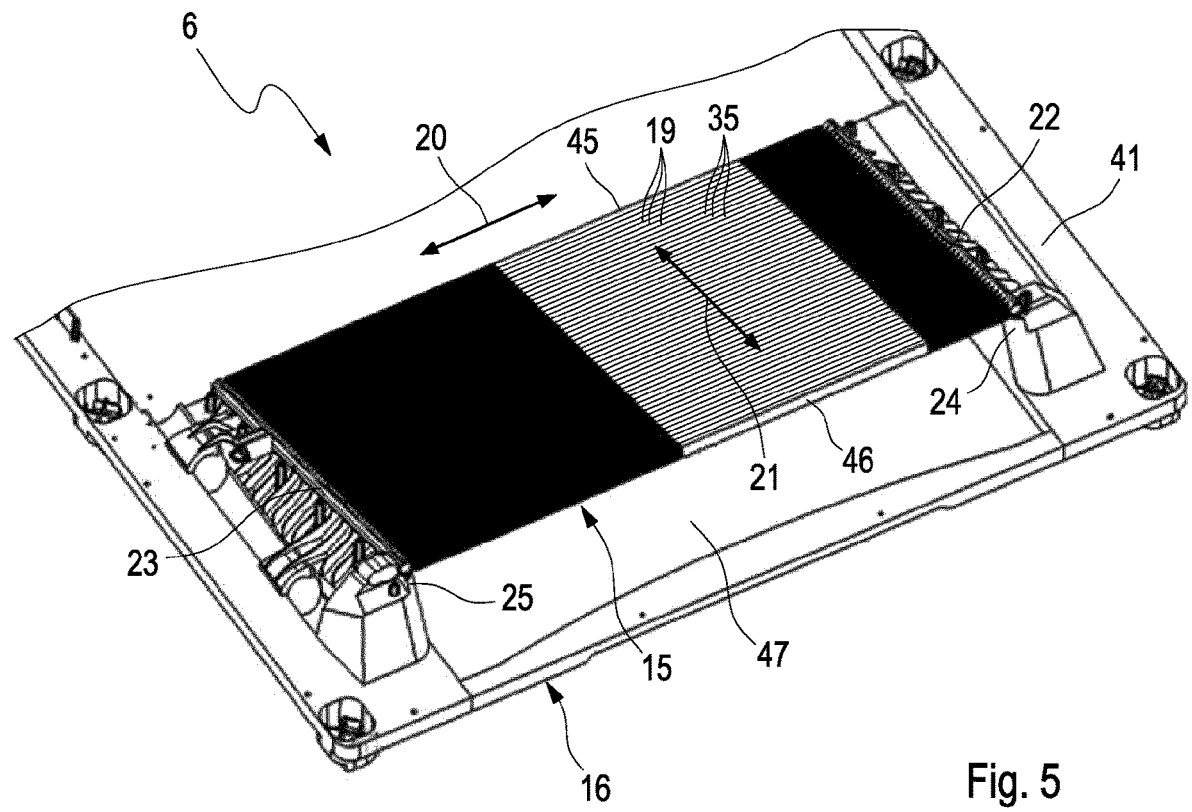
Figure 6:
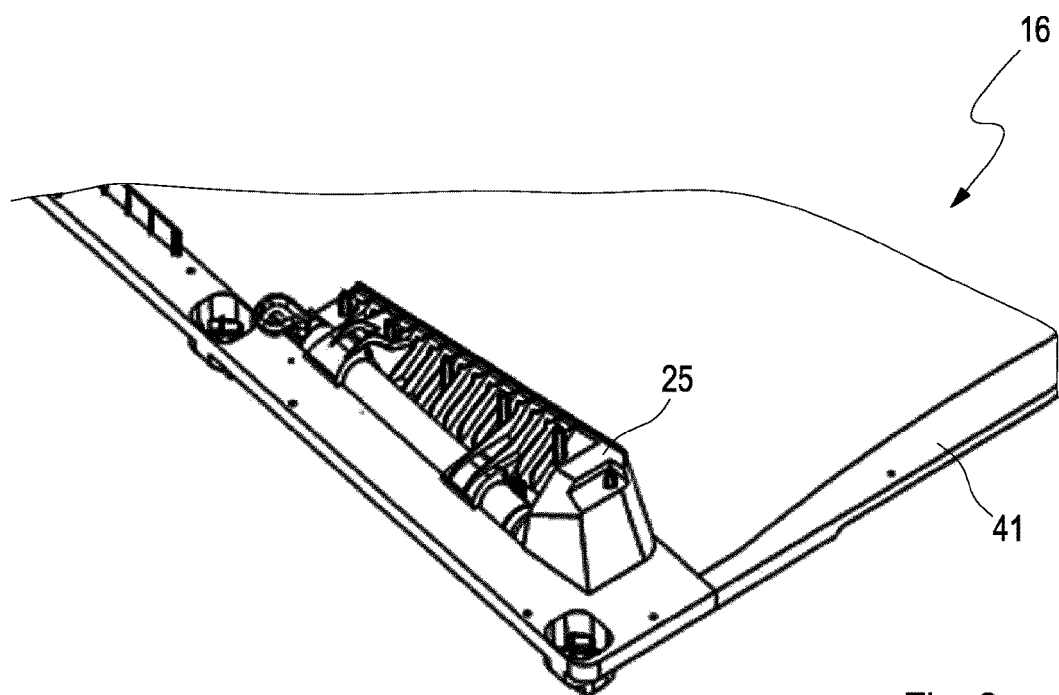

According to FIG. 4, the frame 41 is substantially configured flat and lies in a frame plane 42. The condenser 15 is likewise configured largely flat so that it lies in a condenser plane 43. In the assembled state, the condenser plane 43 however is inclined relative to the frame plane 42. A corresponding inclination angle 44 is indicated in FIG. 4. A first transverse end 45 of the condenser 15 faces away from the beholder in FIGS. 4 and 5 and is arranged proximally with respect to the frame plane 42. In FIG. 4, instead of this first transverse end 45 of the condenser 15, a frame section 45' of the fan frame 17 is noticeable instead, against which said first transverse end 45 with installed condenser 15 comes to lie. A second transverse end 46 of the condenser 15 is arranged distally with respect to the frame plane 42, at any rate further away than the first transverse end 45. In FIG. 4, an edge region 46' of the fan frame 17 assigned to this second transverse end 46 is noticeable. Between the frame 41 and the condenser 15, an air inlet opening 47 is formed in the region of the second transverse end 46. During the operation of the condenser unit 6, air from the surroundings 14 can enter the condenser unit 6 through this air inlet opening 47.

According to FIGS. 3 and 4, the fan frame 17 has an air outlet opening 48 through which, during the operation of the condenser unit 6, air can exit the condenser unit 6 and enter the surroundings 14. On or in this air outlet opening 48 the condenser blower 18 is arranged. Practically, the condenser blower 18 is fastened to the fan frame 17. According to FIG. 4, the air outlet opening 48 practically lies in an outlet plane 49 which extends substantially parallel to the frame plane 42. The second transverse end 46 of the condenser 15 lies in the region of this outlet plane 49, as a result of which altogether an extremely compact or flat construction for the condenser unit 6 can be realised. According to FIGS. 2 and 3, the hood 7 has several lateral inlet openings 50 which lead to the air inlet opening 47, and an outlet opening 51, which is arranged aligned with the air outlet opening 48.

Here, the condenser air outlet opening 51 is configured as substantially circular opening. Instead of a single condenser air outlet opening 51 that is centrally arranged or arranged in the middle, two condenser air outlet openings 51 can also be arranged next to one another on the hood 7 in the case of another more powerful embodiment. In the shown examples, the hood 7 is already prepared for two such condenser air outlet openings 51 lying next to one another. The corresponding circular contours overlap the realised central condenser air outlet opening 51. For the more powerful embodiment, these two circular contours are then cut out or punched out instead of the central condenser air outlet opening 51 for realising the two condenser outlet openings 51 which then lie next to one another. Accordingly it is clear that with this more powerful embodiment two condenser blowers 18 are then also provided in the appropriately adapted fan frame 17.

The fan frame 17 defines a flow duct 52 indicated by an arrow in FIG. 4 and drawn with a dashed line, which leads from the condenser 15 to the condenser blower 18.

The invention claimed is:

1. A condenser unit for a roof-mounted air conditioning system of a road vehicle comprising:
   a condenser having a plurality of condensation tubes running in a longitudinal direction of the condenser parallel to one another, the condensation tubes each having a first longitudinal end and a second longitudinal end, wherein the longitudinal ends are connected to a first collection tube of the condenser and to a second collection tube of the condenser, which extend at a respective longitudinal end of the condenser in each case in a transverse direction of the condenser,
   a carrier configured to secure the condenser unit to a vehicle roof, the carrier comprising a first support region assigned to the first collection tube configured to support the first collection tube, and a second support region assigned to the second collection tube configured to support the second collection tube,
   a fan frame defining a flow duct leading from the condenser to a condenser blower, the fan frame secured to the carrier and having a first retaining region assigned to the first collection tube and a second retaining region assigned to the second collection tube, and
   wherein the condenser is held on the carrier via the fan frame in that the first collection tube having the first retaining region is held on the first support region, and the second collection tube having the second retaining region is held on the second support region.

2. The condenser unit according to claim 1, wherein:
   the first support region, the first retaining region and the first collection tube, with respect to the longitudinal direction of the condenser, define a fixed bearing for the condenser, and
   the second support region, the second retaining region and the second collection tube, with respect to the longitudinal direction of the condenser, define a loose bearing for the condenser.

3. The condenser unit according to claim 1, wherein on at least one of the first support region and the first retaining region at least one contact contour is provided, and wherein the at least one contact contour at least partially engages over the first collection tube on a side facing the second collection tube.

4. The condenser unit according to claim 1, wherein on at least one of the first support region and the first retaining region at least one contact rib is provided, and wherein on the first collection tube, on a side facing the second collection tube, the at least one contact rib engages in an intermediate space defined between two adjacent condensation tubes.

5. The condenser unit according to claim 1, wherein the first retaining region and the second retaining region are integrally moulded on the fan frame.

6. The condenser unit according to claim 1, wherein the fan frame comprises an air outlet opening, and wherein the condenser blower is arranged on or in the air outlet opening and secured to the fan frame.

7. The condenser unit according to claim 1, wherein at least one of the carrier and the fan frame comprise a plastic.

8. The condenser unit according to claim 1, wherein in an assembled state, the first retaining region and the first support region define a first mounting for the first collection tube and the second retaining region and the second support region define a second mounting for the second collection tube.

9. The condenser unit according to claim 1, wherein the first collection tube and the second collection tube are soldered to at least one of the plurality of condensation tubes.

10. The condenser unit according to claim 1, wherein the carrier comprises a frame for securing the condenser unit to the vehicle roof, and wherein the first support region and the second support region are defined on the frame.

11. The condenser unit according to claim 10, wherein the first support region and the second support region are integrally moulded on the frame.

12. The condenser unit according to claim 10, wherein:
   the frame is substantially flat and lies in a frame plane, and
   the condenser is substantially flat and lies in a condenser plane, inclined relative to the frame plane.

13. The condenser unit according to claim 12, wherein the frame plane and the condenser plane are arranged at an angle of at most 30°.

14. The condenser unit according to claim 12, wherein the frame plane and the condenser plane are arranged at an angle of at most 20°.

15. The condenser unit according to claim 12, wherein the frame plane and the condenser plane are arranged at an angle of at most 15°.

16. The condenser unit according to claim 12, wherein:
   the condenser is arranged in a region of a first transverse end nearer the frame plane than in a region of a second transverse end, and in the region of the second transverse end of the condenser an air inlet opening is defined between the frame and the condenser.

17. The condenser unit according to the claim 16, wherein:
the air outlet opening lies in an outlet plane extending substantially parallel to the frame plane, and
the second transverse end of the condenser lies in a region of the outlet plane.

18. A roof-mounted air conditioning system for a road vehicle comprising:
an evaporator unit comprising at least one evaporator;
a condenser unit comprising: a condenser having a plurality of condensation tubes running in a longitudinal direction of the condenser parallel to one another, the condensation tubes each having a first longitudinal end and a second longitudinal end, wherein the longitudinal ends are connected to a first collection tube of the condenser and to a second collection tube of the condenser, which extend at a respective longitudinal end of the condenser in each case in a transverse direction of the condenser; a carrier configured to secure the condenser unit to a vehicle roof, the carrier comprising a first support region assigned to the first collection tube configured to support the first collection tube, and a second support region assigned to the second collection tub configured to support the second collection tube; a fan frame defining a flow duct leading from the condenser to a condenser blower, the fan frame secured to the carrier and having a first retaining region assigned to the first collection tube and a second retaining region assigned to the second collection tube; and wherein the condenser is held on the carrier via the fan frame in that the first collection tube having the first retaining region is held on the first support region, and the second collection tube having the second retaining region is held on the second support region; and
a hood, wherein the hood covers the evaporator unit and the condenser unit.

19. The condenser unit according to claim 18, wherein the evaporator unit further includes an evaporator blower configured to drive a cooling air flow.

20. A condenser unit for a roof-mounted air conditioning system of a road vehicle comprising:
a condenser having a plurality of condensation tubes running in a longitudinal direction of the condenser parallel to one another, the condensation tubes each having a first longitudinal end and a second longitudinal end, wherein the longitudinal ends are connected to a first collection tube of the condenser and to a second collection tube of the condenser, which extend at a respective longitudinal end of the condenser in each case in a transverse direction of the condenser;
a carrier configured to secure the condenser unit to a vehicle roof, the carrier comprising a first support region assigned to the first collection tube configured to support the first collection tube, and a second support region assigned to the second collection tube configured to support the second collection tube;
a fan frame defining a flow duct leading from the condenser to a condenser blower, the fan frame secured to the carrier and having a first retaining region assigned to the first collection tube and a second retaining region assigned to the second collection tube;
wherein the condenser is held on the carrier via the fan frame in that the first collection tube having the first retaining region is held on the first support region, and the second collection tube having the second retaining region is held on the second support region;
wherein the first support region, the first retaining region and the first collection tube, with respect to the longitudinal direction of the condenser, define a fixed bearing for the condenser;
wherein the second support region, the second retaining region and the second collection tube, with respect to the longitudinal direction of the condenser, define a loose bearing for the condenser; and
wherein on at least one of the first support region and the first retaining region at least one contact contour is provided, wherein the at least one contact contour at least partially engages over the first collection tube on a side facing the second collection tube.

* * * * *